(12) United States Patent
Sato et al.

(10) Patent No.: US 8,072,612 B2
(45) Date of Patent: Dec. 6, 2011

(54) METHOD AND APPARATUS FOR DETECTING A FEATURE OF AN INPUT PATTERN USING A PLURALITY OF FEATURE DETECTORS, EACH OF WHICH CORRESPONDS TO A RESPECTIVE SPECIFIC VARIATION TYPE AND OUTPUTS A HIGHER VALUE WHEN VARIATION RECEIVED BY THE INPUT PATTERN ROUGHLY MATCHES THE RESPECTIVE SPECIFIC VARIATION TYPE

(75) Inventors: Hiroshi Sato, Kawasaki (JP); Masakazu Matsugu, Yokohama (JP); Katsuhiko Mori, Kawasaki (JP); Kan Torii, Pittsburgh, PA (US); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 11/961,982

(22) Filed: Dec. 20, 2007

(65) Prior Publication Data

US 2008/0212098 A1  Sep. 4, 2008

(30) Foreign Application Priority Data

Dec. 22, 2006  (JP) .................. 2006-346263

(51) Int. Cl.
*G01B 11/24* (2006.01)

(52) U.S. Cl. ...................................... 356/601; 382/115
(58) Field of Classification Search .................. 356/601, 356/603; 382/115–118
See application file for complete search history.

(56) References Cited

U.S. PATENT DOCUMENTS

| | | | |
|---|---|---|---|
| 7,558,408 B1* | 7/2009 | Steinberg et al. | 382/118 |
| 2003/0095711 A1* | 5/2003 | McGuinness et al. | 382/209 |

FOREIGN PATENT DOCUMENTS

| | | |
|---|---|---|
| JP | 2000-090191 A | 3/2000 |
| JP | 2001-092924 A | 4/2001 |
| JP | 2004-005303 A | 1/2004 |
| JP | 2004-133637 A | 4/2004 |
| JP | 2005-061853 A | 3/2005 |

OTHER PUBLICATIONS

Lawrence et al., "Face Recognition: A Conventional Neural-Network Approach", IEEE Transactions on Neural Networks, vol. 8, pp. 98 to 113, 1997.

* cited by examiner

*Primary Examiner* — Tarifur Chowdhury
*Assistant Examiner* — Tara S Pajoohi (57) ABSTRACT

A method includes detecting a feature of an input pattern using a plurality of feature detectors, selecting at least one of the feature detectors based on their output values, and calculating a feature quantity of the input pattern based on an output value from at least one selected feature detector.

14 Claims, 13 Drawing Sheets

FIG. 13

METHOD AND APPARATUS FOR DETECTING A FEATURE OF AN INPUT PATTERN USING A PLURALITY OF FEATURE DETECTORS, EACH OF WHICH CORRESPONDS TO A RESPECTIVE SPECIFIC VARIATION TYPE AND OUTPUTS A HIGHER VALUE WHEN VARIATION RECEIVED BY THE INPUT PATTERN ROUGHLY MATCHES THE RESPECTIVE SPECIFIC VARIATION TYPE

BACKGROUND OF THE INVENTION

1. Field of the Invention

The present invention relates to a method of realizing highly accurate feature detection even when variation occurs, for example, in a size or direction of a detection target pattern.

2. Description of the Related Art

In the field of pattern recognition, there has been a strong demand for a method capable of realizing accurate feature detection regardless of variation in a size or a direction of a recognition target. There has also been a strong demand to know what type of variation a pattern has received.

For example, a method has been discussed for efficiently detecting a face image even in a non-frontal view (Japanese Patent Application Laid-Open No. 2004-133637). According to this method, a correlation is obtained between an input image and a template image of a predetermined size. The template image represents an average face image. When it is determined that the input image is not a frontal view, the template image is rotated by a predetermined angle or angles which are sequentially updated, and collation is repeated.

A method has also been described for preparing affine transformation parameters each corresponding to variation of a human face image which is a recognition target, detecting the face image after inverse transformation, and combining a plurality of detection results (Japanese Patent Application Laid-Open No. 2000-90191). In this case, the variation corresponds to positional shifting of the face image, inclination, a change in vertical direction, or a change in horizontal direction. As a combining method, a highest point or decision by majority is employed.

However, according to the aforementioned conventional transformation based method, many templates or parameters need to be prepared for pattern variation and, to obtain a highly accurate estimation about variation, a large amount of processing is needed. As the method for combining many detection results, the highest point or the decision by majority is not sufficient to estimate features regarding variation with a high degree of accuracy.

SUMMARY OF THE INVENTION

The present invention is directed to realization of highly efficient and highly accurate pattern feature detection and variation estimation.

According to an aspect of the present invention, a method includes detecting a feature of an input pattern using a plurality of feature detectors, selecting at least one of the plurality of feature detectors based on output values thereof, and calculating a feature quantity of the input pattern based on an output value from at least one selected feature detector.

According to another aspect of the present invention, a feature detection apparatus includes a detection unit configured to detect a feature of an input pattern using a plurality of feature detectors, a selection unit configured to select at least one of the plurality of feature detectors based on output values thereof, and a calculation unit configured to calculate a feature quantity of the input pattern based on an output value from at least one selected feature detector.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
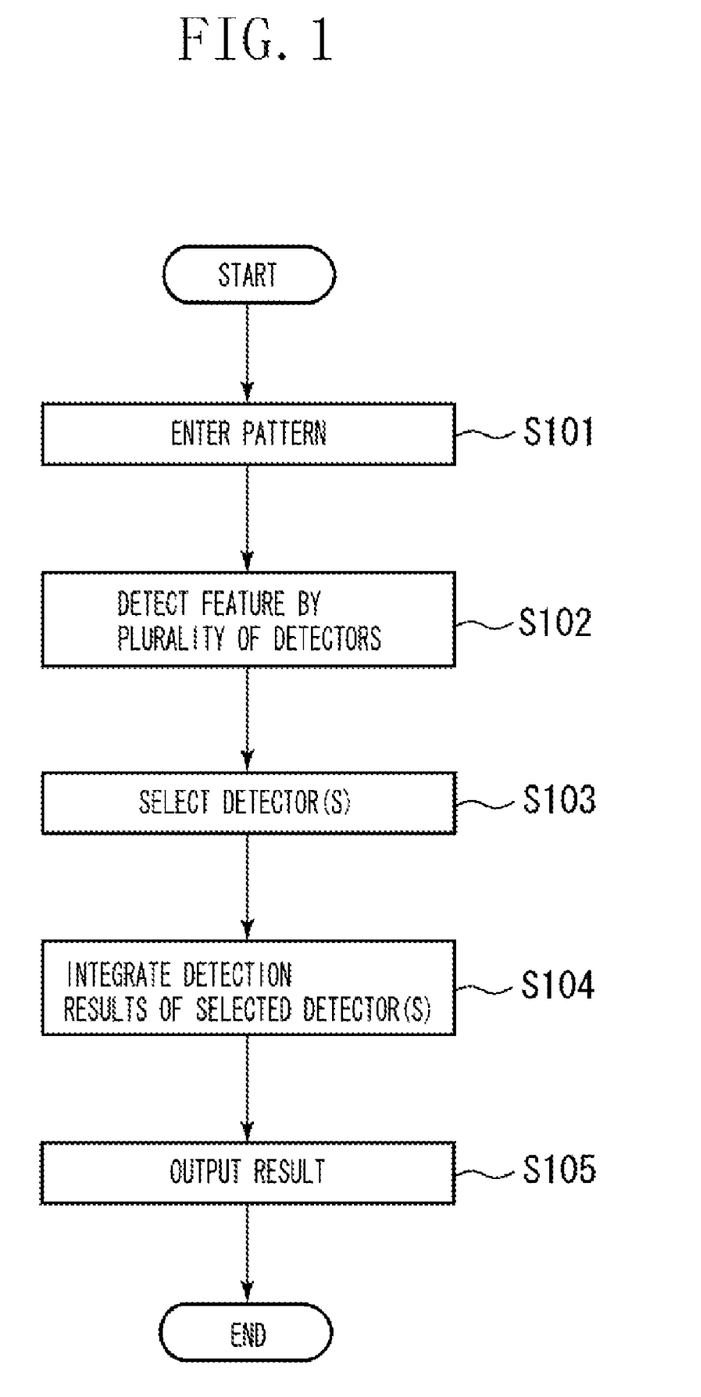
FIG. 1 is a flowchart illustrating an overall process according to a first exemplary embodiment of the present invention.

FIG. 1 is a flowchart illustrating an overall process of a pattern detection method according to a first exemplary embodiment of the present invention. In step S101, a pattern detection apparatus 100 shown in FIG. 8 receives a signal regarding a luminance pattern, a waveform pattern, or a frequency feature, of a detection target for example, and stores it in a primary storage medium such as a main memory or a frame buffer.

In step S102, the pattern detection apparatus 100 performs a feature detection process as to the received pattern using a plurality of detectors. The feature detection process is carried out as to the luminance pattern, the waveform pattern, or the frequency feature using a conventional pattern recognition method (e.g., hierarchical neural network, support vector machine, or discrimination analysis).

Each detector specializes in a specific variation type (size, direction, hue, spatial frequency, or illumination condition) defined by a plurality of parameters of an input pattern. Accordingly, when variation received by the input pattern roughly matches the variation type of the detector, the detector produces a higher response output than otherwise.

For example, the detector may be a hierarchical neural network as described in Lawrence et al., "Face Recognition: A Conventional Neural-Network Approach, IEEE Transactions on Neural Networks, vol. 8, pp. 98 to 113, 1997, the entirety of which is hereby incorporated by reference herein, a detection target pattern may be a luminance pattern of a face image, and a specific variation type may correspond to a change in size or direction of a face.

To prepare a detector which senses a specific angle and size, a face image data set limited to the angle and size (e.g., front facing ±5°, and 30×30 pixels in VGA image) is prepared, and supervised learning is carried out. Thus, a detector that can strongly sense a luminance pattern of a face of a specific angle and size can be produced even in a case where the same face is represented at various angles and sizes.

After the feature detection by the plurality of detectors is performed in step S102, in step S103, the pattern detection apparatus 100 carries out a detector selection process. For example, the detector selection process of step S103 may be executed through a procedure shown in FIG. 2. First, in step S201, the pattern detection apparatus 100 selects a detector to be used as a reference. In step S202, the pattern selection apparatus 100 selects a detector or detectors that deviate from the reference detector by less than a predetermined amount and the other detectors are not selected.

In the detector selection process of step S103, detectors that produce a response output smaller than a predetermined amount may be omitted from the selection process before making a comparison with the reference detector. In this step, both the reference detector and one or more other detectors are selected.

Figure 2:
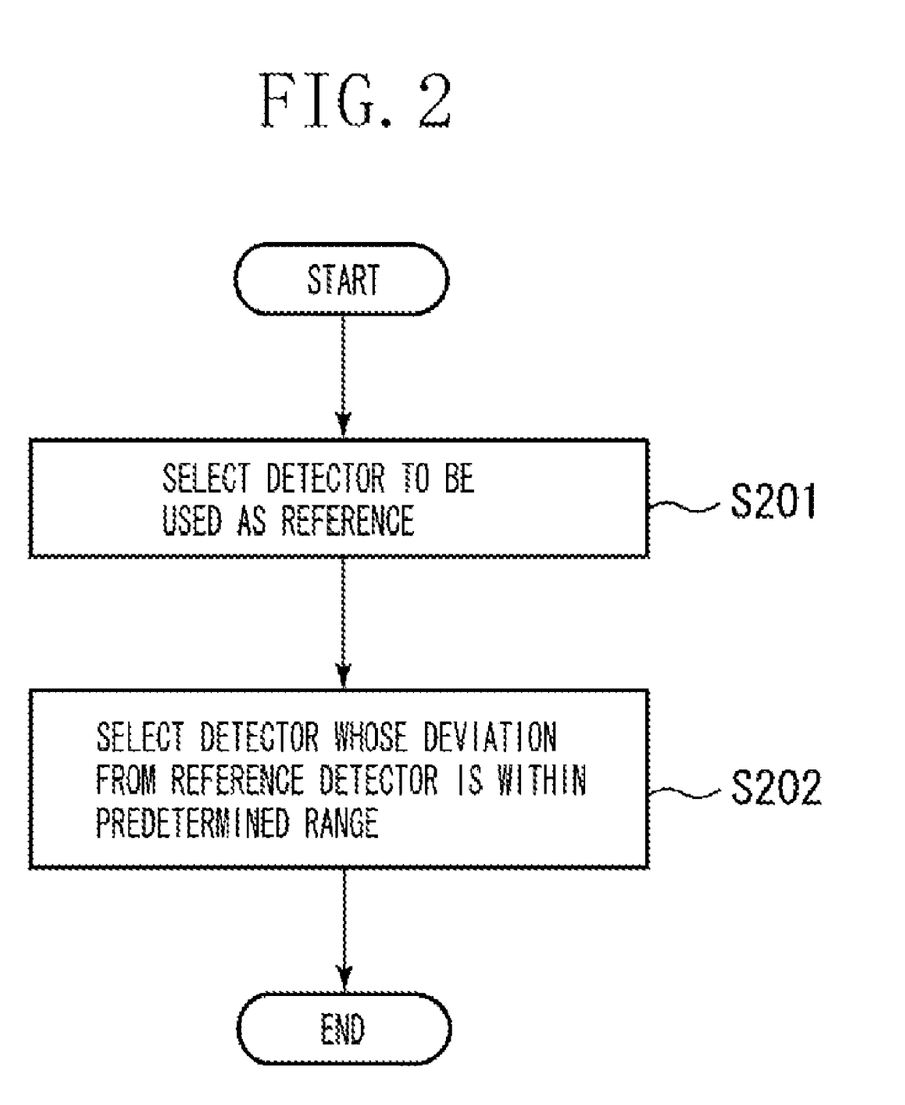
FIG. 2 is a flowchart illustrating a detector selection process according to the first exemplary embodiment.

In step S201, the selection of the reference detector can be based on response output values of the plurality of detectors. For example, a detector producing a largest response can be selected as the reference detector, or alternatively a detector producing a second largest response can be selected as the reference detector thereby addressing a possibility of erroneous detection in the detector of largest response. Alternatively, an average can be calculated of the response output values of all detectors, and a detector having a response output value closest to the average can be employed as a reference detector.

Selection of a reference detector from the plurality of detectors may thus be made using statistics regarding response output values, and there is no limitation concerning a kind of statistics. Frequently, it is useful to use statistics having low computational complexity.

When deviation from the reference detector is determined, it is advisable to use a variation value corresponding to each detector. For example, when variation types of the detectors correspond to in-plane rotational angles of a human face, a response output of a detector having a variation type that corresponds to an angle which is away by a predetermined angle (e.g., ±60°) or more from the reference detector may be caused by erroneous detection. Accordingly, it is effective to remove such erroneous detection to increase estimation accuracy.

Figure 3:
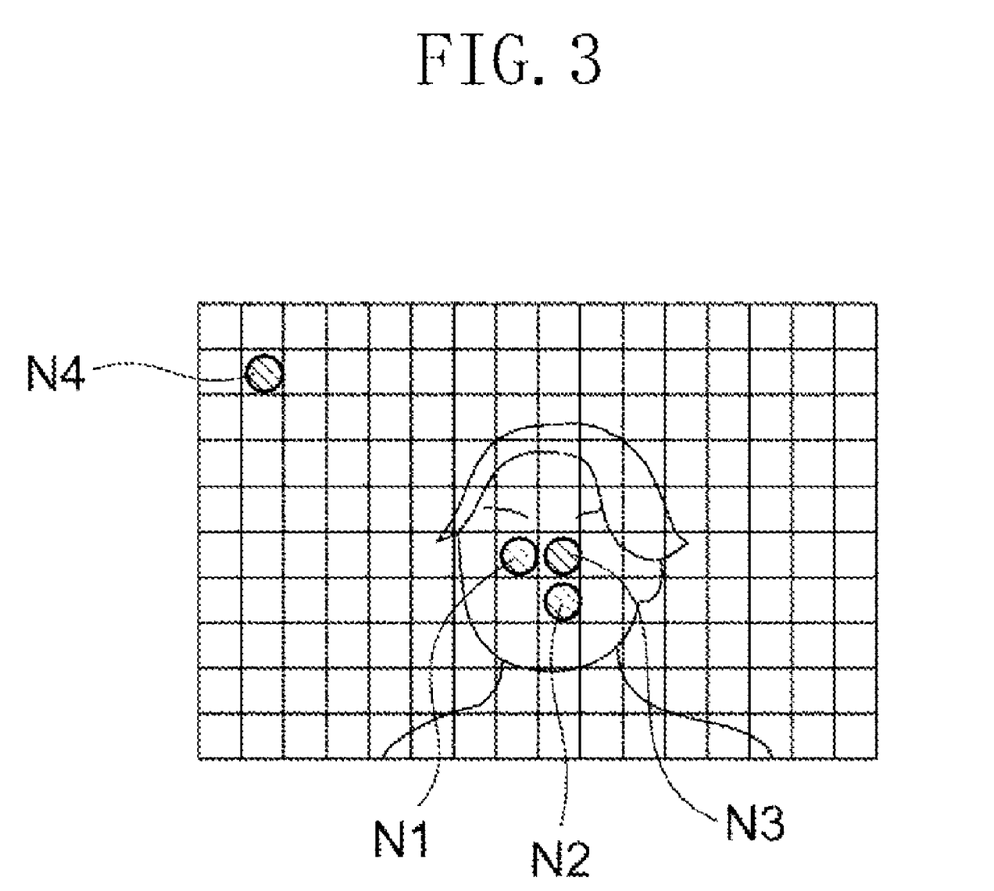
FIG. 3 is a diagram illustrating a detector and a luminance pattern related to each other to constitute a 2-dimensional array.

To determine deviation from the reference detector, a distance between the detectors can also be used as a reference. Referring to FIG. 3, this case will be specifically described. FIG. 3 schematically illustrates an example where detectors sensing a luminance pattern of an object are arranged 1 to 1 or n to 1 with respect to a 2-dimensional pixel array of the luminance pattern (case of sub-sampling). In FIG. 3, circles N1 to N4 indicate detectors whose response output values exceed the predetermined amount in step S103.

Where distance between detectors is used as a reference, if the reference detector selected in step S201 is a detector N1, a response output of the detector N4 located at a predetermined distance (typically, a size of corresponding object of the reference detector) or more from the detector N1 may be caused by erroneous detection. Accordingly, in this case, it is not advisable to combine response outputs of the detectors N1 and N4, while outputs of the detectors N1, N2 and N3 should be combined. Thus, it is reasonable to combine detectors located within a predetermined distance from the reference detector.

The deviation from the reference detector can be determined by using both the variation values of the detectors and the distance between the detectors. It is expected that better effects can be obtained in this way to improve variation estimation accuracy.

Subsequently, in step S104, as shown in FIG. 1, the pattern detection apparatus 100 combines the plurality of selected detection results. This is a step of calculating a feature of the pattern and its estimated variation amount from a response output of each detector selected in step S103. In step S105, the calculated feature of the pattern and estimated variation amount are output.

Figure 4:
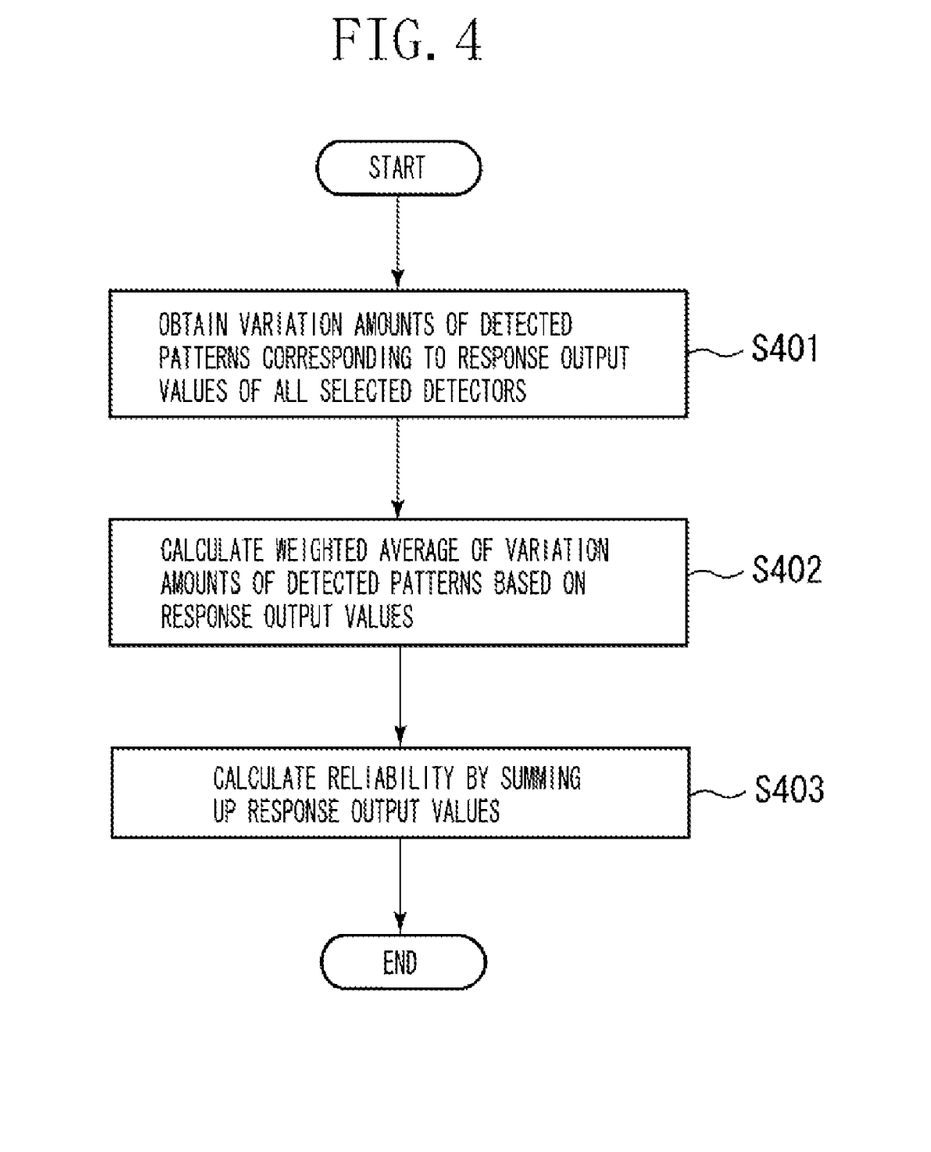
FIG. 4 is a flowchart illustrating a combining process according to the first exemplary embodiment.

For example, step S104 may be implemented as shown in FIG. 4. First, in step S401, the pattern detection apparatus 100 obtains response output values of all the selected detectors, and obtains variation amounts of corresponding detected patterns. In step S402, the pattern detection apparatus 100 calculates a weighted average of the variation amounts based on the response output values through an equation (1) where V is an estimated variation amount of a detected pattern to be obtained. In equation (1), the summations are carried out for the detectors selected in step S103. Vi is a corresponding variation value of an i-th detector among the selected detectors, and fi is a response output value of the i-th detector.

$$V = \frac{\sum_i v_i \times f_i}{\sum_i f_i} \quad (1)$$

In step S403, the pattern detection apparatus 100 sums up response output values of the selected detectors by an equation (2) where C is reliability to be obtained and fi is a response output value of the i-th detector. The summations are carried out for those detectors selected in step S103. The pattern feature calculated in steps S402 and S403 and reliability of estimation accuracy of its variation amount can be added to an obtained result.

$$C = \sum_i f_i \qquad (2)$$

Where only one detector is selected in step S103, summations are carried out for just the one selected detector.

In the case of calculating the reliability C, the following method can also be used. Referring now to an equation (3), a transform function T is applied to the response output values fi of the plurality of detectors, and a reliability different from that indicated by equation (2) can be calculated. In equation (3), the summations are carried out for all of the detectors as different from the calculation of the equation (2).

$$C = \sum_i T(f_i) \qquad (3)$$

The following equation can be employed as a specific form of the transform function T.

$$T(f_i) = \begin{cases} f_i & |v_i - v_s| \le th_2 \\ -a \times f_i & |v_i - v_s| > th_2 \end{cases} \qquad (4)$$

In the equation (4), a is a positive constant, $v_s$ is a variation value corresponding to the reference detector selected in step S201, and $th_2$ is a predetermined threshold value.

The equation (4) is now further described. As to a detection result of a detector separated from corresponding variation of the reference detector by more than a predetermined value ($th_2$), with respect to the reliability of the equation (2), a possibility of erroneous detection is higher, and such may also be true when combined results of all detections are used. Accordingly, a value proportional to the response output value of the detector which is separated from the reference detector by more than the predetermined value is subtracted from the reliability.

Figure 5:
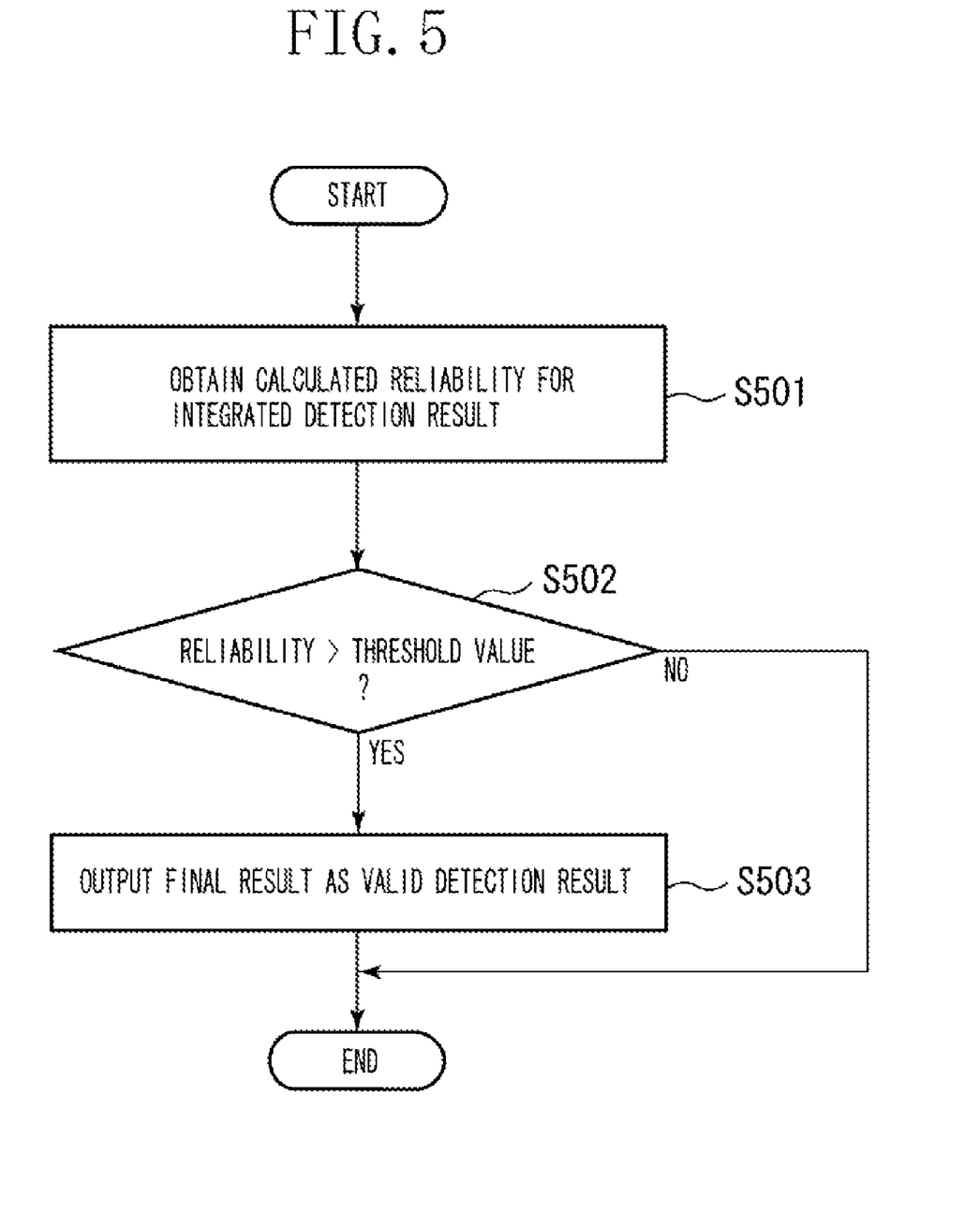
FIG. 5 is a flowchart illustrating a threshold value process based on reliability according to the first exemplary embodiment.

Referring to a flowchart of FIG. 5, a process using the reliability C will be described. In step S501, the pattern detection apparatus 100 obtains reliability from the combined detection result. In step S502, the pattern detection apparatus 100 uses the obtained reliability C to make a final assessment as to a threshold value of a result output. If the obtained reliability C exceeds a threshold value, processing continues in step S503 wherein the pattern detection apparatus 100 outputs only a result output whose reliability C is larger than a predetermined threshold value as a final result, and the process ends. On the other hand, if reliability C of the result output is lower than the threshold value in step S502, then as a final result, because of a high possibility of erroneous detection, the result output is not considered to be final, and the process ends.

Figure 6:
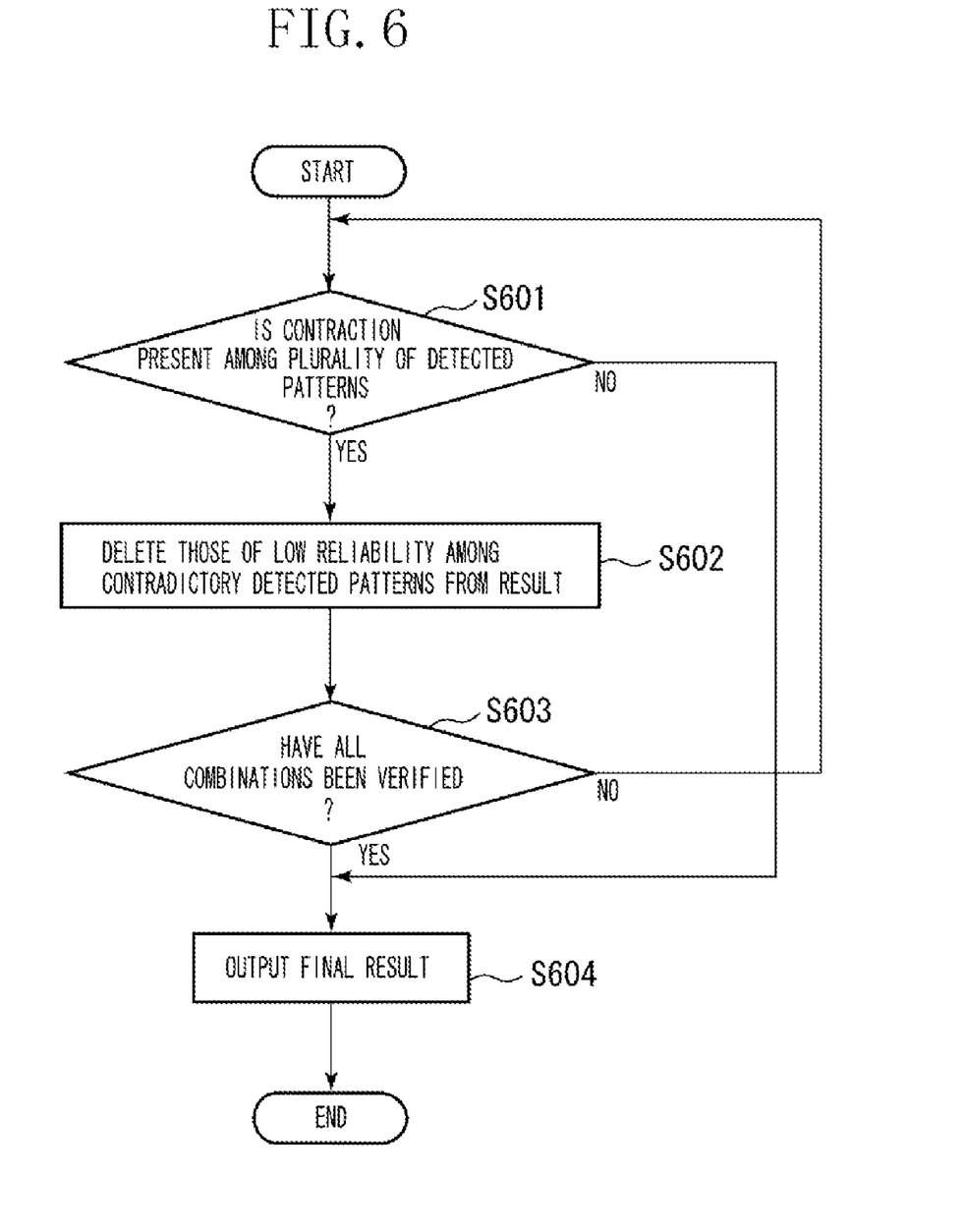
FIG. 6 is a flowchart illustrating a contradictory relation elimination process between objects based on reliability according to the first exemplary embodiment.

Referring to FIG. 6, a process using another reliability C will be described. In this example, the description focuses primarily on a detection process of a 2-dimensional luminance pattern for the sake of simplicity. However, the detection does not need to be limited to a 2-dimensional pattern, and an input does not need to be limited to the luminance pattern.

First, in step S601, the pattern detection apparatus 100 determines whether there is a contradiction among a plurality of patterns which was subjected to a detection and variation estimation process. If there is no contradiction (NO in step S601), in step S604, the pattern detection apparatus 100 outputs a final result to finish the process. On the other hands, if contradictory detected patterns are present (YES in step S601), then in step S602, the pattern detection apparatus 100 compares sizes of reliability thereof. The pattern detection apparatus 100 employs a pattern of larger reliability while deleting the pattern of smaller reliability from the result output. In step S603, the pattern detection apparatus 100 determines whether this process has been executed for all the pattern combinations. If the process has been executed (YES in step S603) for all the combinations, in step S604, the pattern detection apparatus 100 outputs a final result. However, in step S603, if the process has not been executed for all the combinations (NO in step S603), then processing returns to step S601.

Figure 7A:
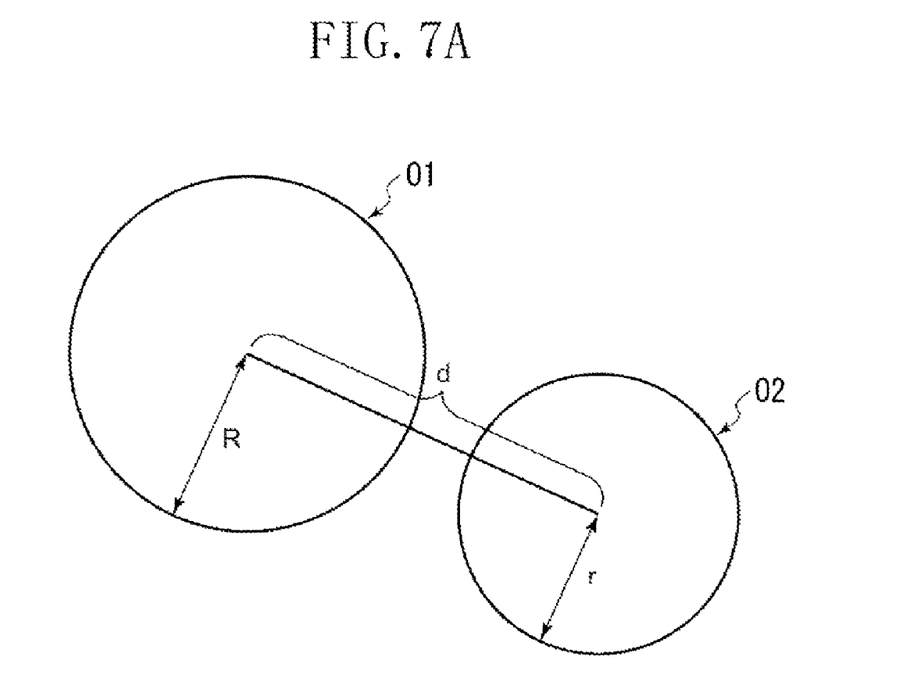
FIGS. 7A and 7B are diagrams illustrating examples of positional relations between objects.
Figure 7B:
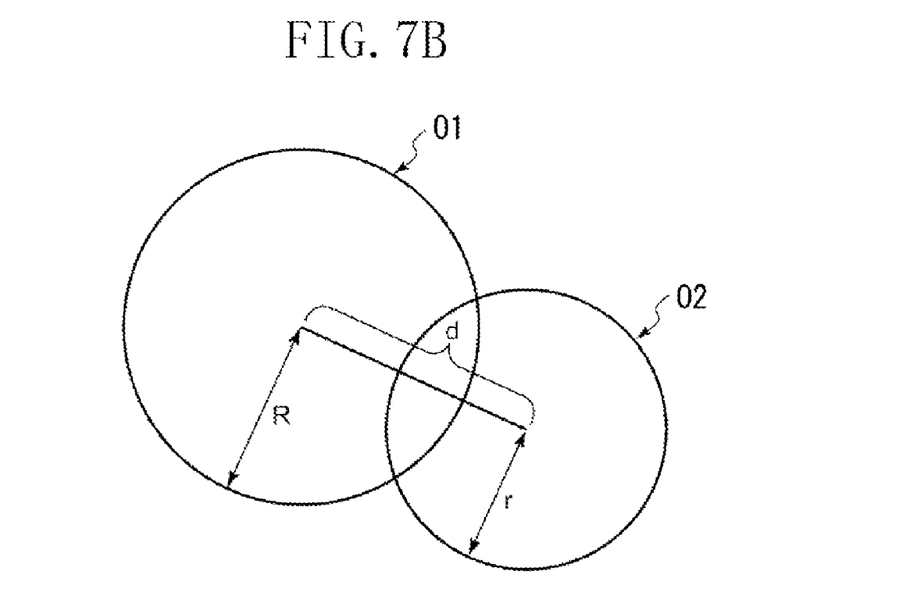

FIG. 7A illustrates an example where objects do not overlap. FIG. 7B illustrates an example where objects overlap each other and may give rise to a contradiction determined according to equation (5). More specifically, FIGS. 7A and 7B illustrate circles O1 and O2 which circumscribe detected objects (not shown), where the circles O1 and O2 have radiuses R and r respectively. When the radiuses R and r of the circles 01 and 02 and a distance d between centers of the circles 01 and 02 satisfy the following equation (5), it is determined that there is undesired overlapping between the objects.

$$d < \alpha(R+r) \qquad (5)$$

In the equation (5), a positive constant $\alpha$ is a parameter for controlling determination of the overlapping. If $\alpha=1$, the overlapping between the objects is not permitted at all. If $\alpha<1$, the overlapping is permitted to a certain extent.

Figure 8:
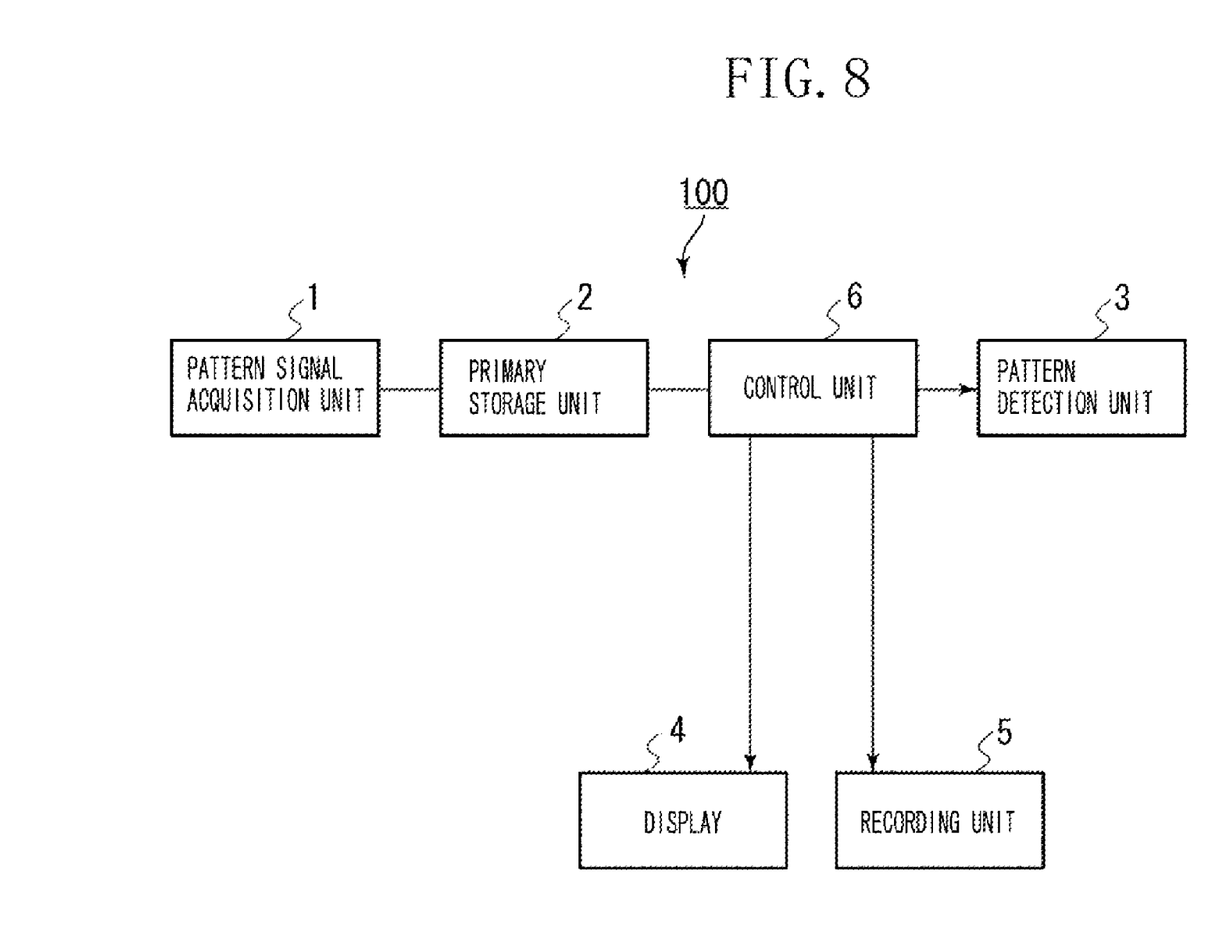
FIG. 8 is a diagram illustrating an entire configuration of a pattern detection apparatus according to the first exemplary embodiment.

FIG. 8 illustrates a configuration of the pattern detection apparatus 100 which may be used to perform the processes of the exemplary embodiments. A pattern signal acquisition unit 1 is, for example, a video input unit which includes an image forming optical system, a video sensor, a sensor signal processing circuit, and a sensor driving circuit. A primary storage unit 2 stores an input pattern from the pattern signal acquisition unit 1. A dedicated circuit (ASIC), and a processor (reconfigurable processor, DSP, or CPU) are installed in a pattern detection unit 3. A display 4 displays a feature of a detected pattern or an input pattern. A recording unit 5 records a detected pattern. A control unit 6 realizes operation control of each unit by executing, for example, a program stored in a RAM (not illustrated) with a CPU (not illustrated). The RAM and CPU may be incorporated in the control unit 6.

Figure 9:
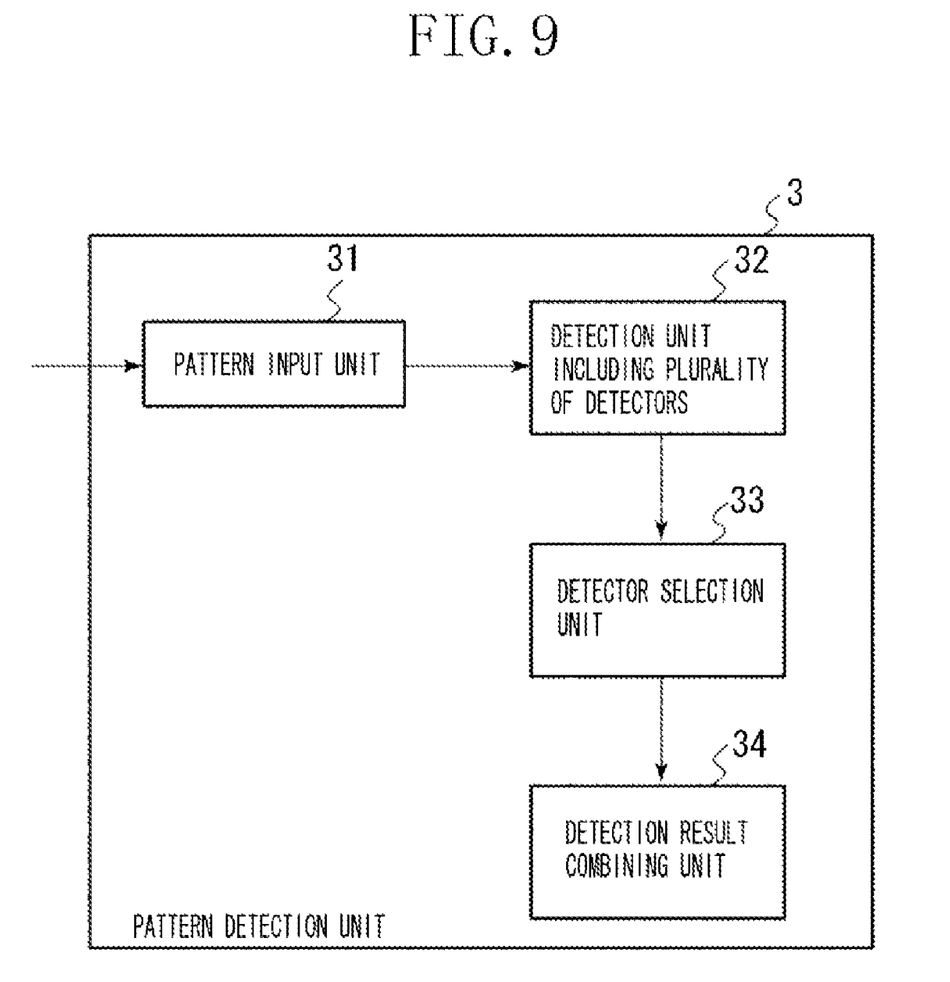
FIG. 9 is a diagram illustrating a configuration of a pattern detection unit according to the first exemplary embodiment.

FIG. 9 illustrates a functional configuration of the pattern detection unit 3. The pattern detection unit 3 includes a pattern input unit 31, a detection unit 32 including a plurality of detectors, a detector selection unit 33, and a detection result combining unit 34. The pattern detection unit 3 performs the above described operation with reference to the flowchart of FIG. 1.

Figure 10:
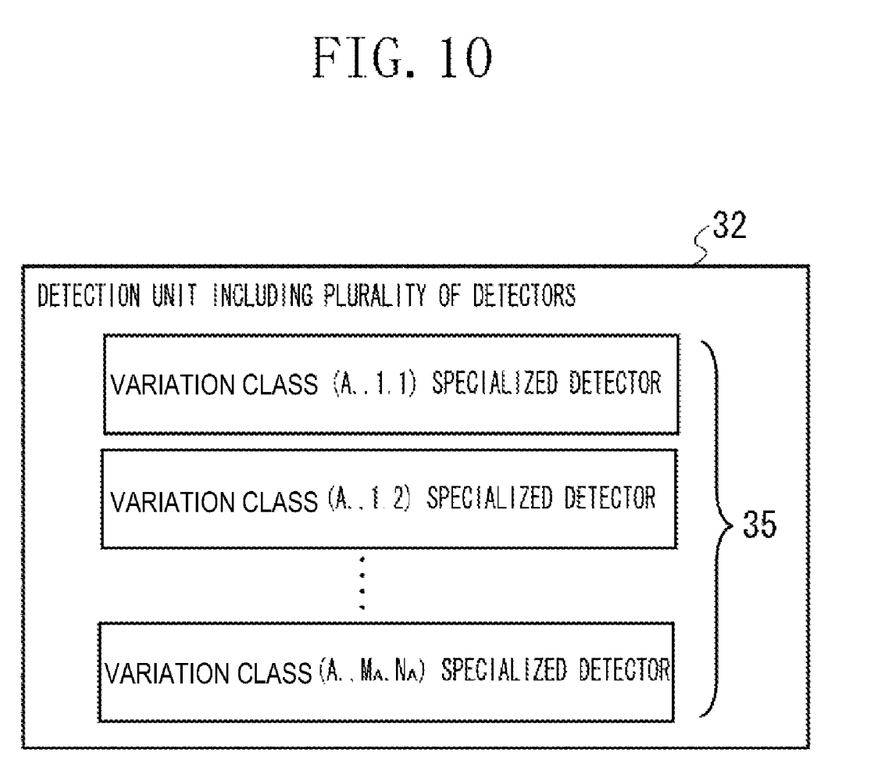
FIG. 10 is a diagram illustrating a configuration of a detection unit which includes a plurality of detectors according to the first exemplary embodiment.

FIG. 10 illustrates a configuration of the detection unit 32 including the plurality of detectors 35. The detection unit 32 includes the plurality of detectors 35 specialized in specific variations defined by a plurality of parameters.

Second Exemplary Embodiment

According to the first exemplary embodiment, the input pattern is input to all the detectors specialized in the specific variations. A second exemplary embodiment of the present invention is different from the first exemplary embodiment in that a preprocessing detection process is set at a previous stage and in that a specific variation detector is selectively operated based on a result of the detection.

Figure 11:
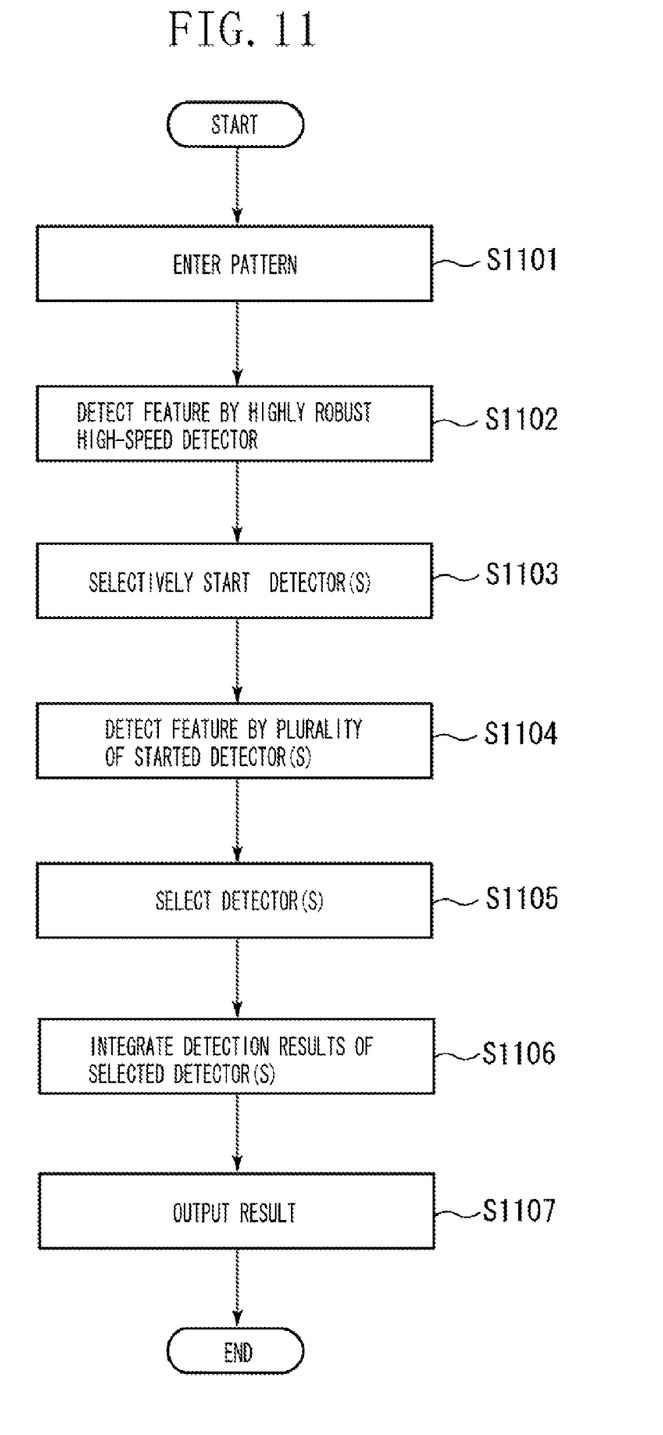
FIG. 11 is a flowchart illustrating an overall process according to a second exemplary embodiment of the present invention.

Referring to FIG. 11, the second exemplary embodiment will be described in detail. Steps S1101, S1105, S1106, and S1107 can be performed in the same manner (or alternatively a similar manner) as steps S101, S103, S104, and S105 of the first exemplary embodiment respectively. To prevent repetition, further description of steps S1101, S1105, S1106, and S1107 is omitted.

FIG. 11 is a flowchart of an overall process of a pattern detection method according to the exemplary embodiment. The present exemplary embodiment is different from the first exemplary embodiment in a first feature detection process performed by a plurality of highly robust detectors (step S1102) and a process of selectively starting detectors among a plurality of specific variation detectors (step S1103).

First, in the first feature detection process (step S1102), a pattern detection apparatus uses a high-speed feature detector capable of detecting relatively robustly variation of an input pattern. To configure such a detector, a conventional statistical pattern recognition method (hierarchical neural network, support vector machine, or discrimination analysis) is used. By adding relatively wide variation (size variation, rotation variation, image quality variation, or frequency variation) to a data set used for learning, a detector which is robust to variation is produced.

However, when excessively wide variation is added to learning data, learning does not progress, so that a good detector is not obtained. Accordingly, by limiting variation to a certain width, and preparing a plurality of detectors, an intended level of robustness can be secured. Since execution of high-speed detection is required in the first feature detection process (step S1102), it is desirable that a higher speed detector is selected even if error detection has to be tolerated to a certain extent.

Subsequently, in step S1103, the pattern detection apparatus determines a detector that is to be started, among the detectors specialized in a plurality of specific variation types, based on a detection result of the first feature detection process (step S1102). The pattern detection apparatus matches the detection result of the first feature detection process (step S1102) with a specific variation of the input pattern. The pattern detection apparatus then starts a specific variation detector which has a high possibility of detecting the specific variation. In step S1104, the pattern detection apparatus supplies the input pattern to the started detector to execute detection.

This start determination process can also be realized by using the conventional statistical pattern recognition method. For example, when the support vector machine is used, an input pattern can be directly used for an input vector. Alternatively, when the high-speed feature detector of the first feature detection process (step S1102) includes a hierarchical neural network, its intermediate feature can be used. The support vector machine has to be trained to enable class identification of the number of specific variation detectors+1 (class which is not "detection target").

For example, the pattern detection apparatus performs learning by using a detection result obtained when an input pattern having specific variation added thereto is supplied to the high-speed feature detector of the first feature detection process (step S1102) as supervised data. The pattern detection apparatus starts a specific variation detector according to a determination result of the support vector machine. In this case, in place of always starting 0 or one specific variation detector, a plurality of detectors can be started. More specifically, the pattern detection apparatus starts not only a specific variation detector determined to match variation but also a detector corresponding to variation in vicinity within a predetermined range.

As another example of realizing determination of the selective start process (step S1103), a method using discrimination analysis is available. As in the case of the support vector machine, for an input vector, an input pattern can be directly used, or an intermediate feature of a hierarchical neural network can be used. Mahalanobis' generalized distance between a pattern of supervised data receiving a specific type of variation and an input pattern obtained as a result of passing through the high-speed feature detector of the first feature detection process (step S1102) is obtained for each specific variation type. Then, a specific variation detector which corresponds to variation of Mahalanobis' generalized distance and which is smaller than a predetermined threshold value is started.

Thus, according to the exemplary embodiment, by narrowing down the specific variation detectors in the selective start process (step S1103), the number of times of detection to be executed can be reduced. Accordingly, processing time can be shortened. Further, since a more proper specific variation detector is started, erroneous detection can be effectively reduced. Furthermore, mixing of erroneous detection in a combining process is simultaneously suppressed; therefore, variation estimation accuracy can be increased.

The process of the exemplary embodiment can be realized by the pattern detection apparatus having a configuration similar to that of the first exemplary embodiment.

Figure 12:
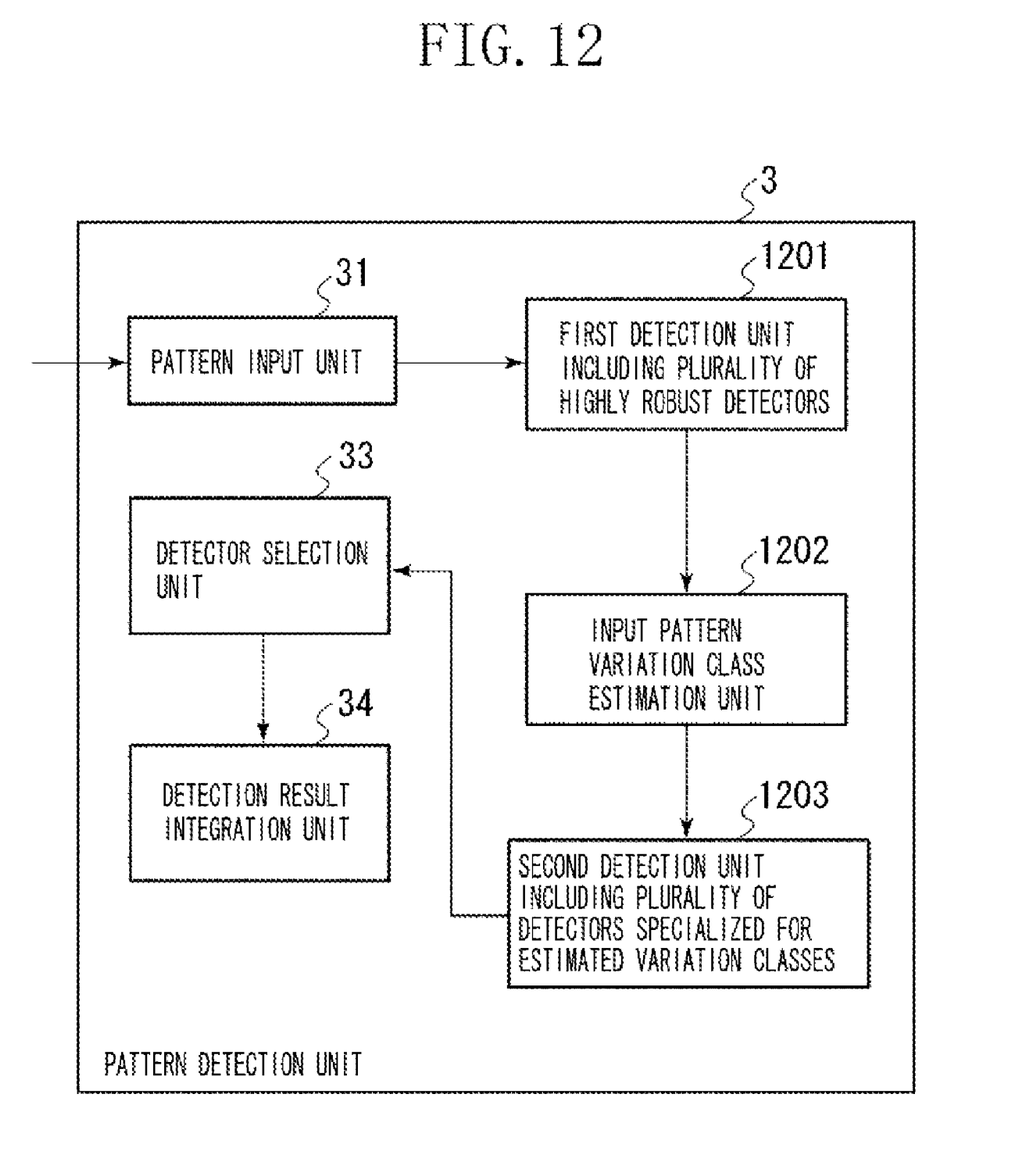
FIG. 12 is a diagram illustrating a configuration of a pattern detection unit according to the second exemplary embodiment.

FIG. 12 illustrates a detailed configuration of a pattern detection unit 3 according to the exemplary embodiment. The pattern detection unit 3 includes a first detection unit 1201 including a plurality of highly robust detectors, an input pattern variation class estimation unit 1202, and a second detection unit 1203 including a plurality of detectors specialized in estimated variation classes. The pattern detection unit 3 additionally includes a pattern input unit 31, a detector selection unit 33, and a detection result combining unit 34 as in (or alternatively similar to) the first exemplary embodiment. These units execute the process described above with reference to the flowchart of FIG. 11.

Figure 13:
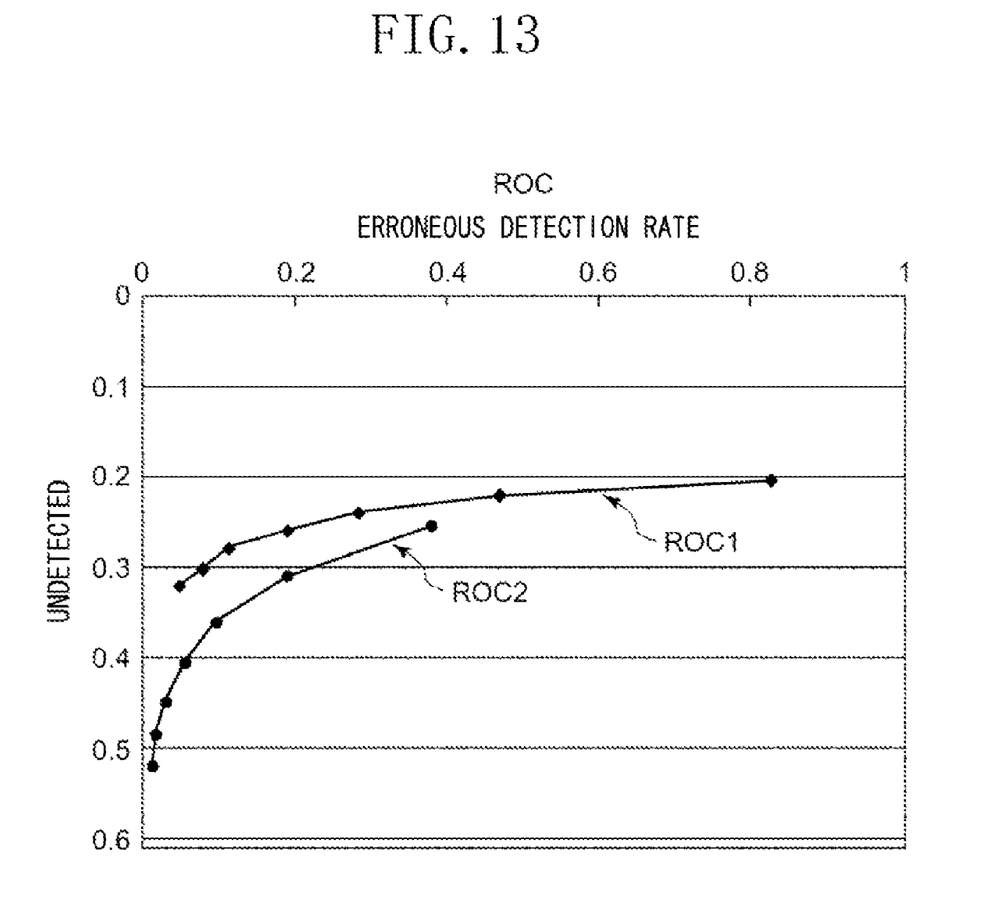
FIG. 13 is a graph illustrating an ROC curve of a pattern detection result.

FIG. 13 is a graph illustrating a pattern detection method in the configuration of the exemplary embodiment, and a result of determination based on reliability. This graph is a receiver operating characteristic (ROC) curve plotting a detection result in the case of changing a reliability threshold value with an abscissa indicating an error detection rate and an ordinate indicating a non-detection rate when an input pattern is a luminance pattern of a human face.

For a high-speed feature detector, three convolutional neural circuit networks of relatively high robustness are prepared. For a specific variation detector determination process, discrimination analysis is used, and an intermediate feature of the convolutional neural circuit network is used as an input vector.

For a specific variation detector, ten convolutional neural networks specialized in specific face sizes and in-plane rotational angles are prepared. As conditions of a combining process, when an in-plane rotational angle deviates by ±60° or more from a reference detector, the detector is not combined with a result output as an invalid detector.

A curve ROC1 of FIG. 13 is obtained as a result of calculating reliability according to the equation (2) and executing threshold value processing. A case where a reliability threshold value is 0 corresponds to a right end of the curve, and the reliability threshold value is plotted each by 0.5 from the right end. As apparent from the graph, up to the vicinity of 2.0 of the reliability threshold value, erroneous detection is suppressed without increasing a non-detection rate greatly.

A curve ROC2 is obtained with a=0.05 in the equation (4). In the curve ROC2, a reliability threshold value is plotted each by 0.25. As compared with the curve ROC1, an effect of suppressing erroneous detection is smaller, but the reliability threshold value processing still effectively works. These two results are obtained in specific cases. Which of the equations (2) and (3) is more effective is determined depending upon a pattern to be detected, a type of variation, or selection of a reference detector.

The present invention includes a case where each of the functions of the exemplary embodiments is realized by processing of the CPU based on an instruction of a program code read from a storage medium.

As the storage medium for supplying the program code, for example, a Floppy® disk, a hard disk, an optical disk, a magneto-optical disk, a CD, a DVD, a magnetic tape, a non-volatile memory card, or a ROM can be used.

The present invention also includes a case where in an image input apparatus, an information storage apparatus, or an apparatus having these apparatus combined therein or connected thereto, the functions of the exemplary embodiments are realized by executing some or all of actual processes via a CPU provided in both or either one of the apparatus.

For the image input apparatus, an image input apparatus of a digital image converted by AD conversion from a camera, a scanner or an analog image input apparatus using various CCD's such as a video camera, a digital camera, and a monitor camera can be used. For the information storage apparatus, an external hard disk or a video recorder can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-346263 filed Dec. 22, 2006, which is hereby incorporated by reference herein in its entirety.

What is claimed is:

1. A method comprising:
   detecting a feature of an identical input pattern using a plurality of feature detectors, each of which corresponds to a respective specific variation type and outputs a higher value when variation received by the input pattern roughly matches the respective specific variation type;
   determining a reference detector from among the plurality of feature detectors based on output values of the plurality of feature detectors;
   selecting a detector other than the reference detector from the plurality of feature detectors by comparing respective output values with an output value of the reference detector; and
   calculating a feature quantity of the input pattern based on an output value from the reference detector and the selected feature detector.

2. The method according to claim 1, wherein in selecting the detector other than the reference detector from the plurality of feature detectors, a detector is selected if a deviation between output values of that detector and the reference detector is less than a predetermined amount.

3. The method according to claim 1, wherein the feature quantity is calculated as a weighted average of variation amounts of the at least one selected feature detector by weighting respective output values.

4. The method according to claim 3, further comprising calculating reliability of the calculated feature quantity based on a sum of the output values of the reference detector and the selected feature detector.

5. The method according to claim 4, further comprising performing threshold processing on the reliability.

6. The method according to claim 4, further comprising, when there is a contradiction in detection results among a plurality of patterns, eliminating the contradiction using the reliability.

7. The method according to claim 6, wherein the contradiction concerns an arrangement relation of the input patterns.

8. The method according to claim 3, further comprising calculating reliability of the feature quantity based on a sum of values obtained by subjecting the output values of the plurality of feature detectors to a predetermined conversion.

9. The method according to claim 1, wherein the input pattern is one selected from a luminance pattern, a waveform pattern, and frequency characteristics of an object.

10. The method according to claim 1, wherein the input pattern is a luminance pattern of an object, and wherein the respective specific variation type is a value selected from a size, a direction, a hue, a spatial frequency, an illumination condition, and a rotation angle of the object.

11. The method according to claim 10, wherein the object is a human face.

12. A program of instructions embodied on a medium readable by a machine and capable of causing the machine to execute the method of claim 1.

13. The program of instructions embodied on a medium readable by a machine of claim 12, wherein the machine is a computer.

14. A feature detection apparatus comprising:
   a detection unit configured to detect a feature of an identical input pattern using a plurality of feature detectors, each of which corresponds to a respective specific variation type and outputs a higher value when variation received by the input pattern roughly matches the respective specific variation type;
   an estimation unit configured to determine a reference detector from among the plurality of feature detectors based on output values of the plurality of feature detectors;
   a selection unit configured to select a detector other than the reference detector from the plurality of feature detectors by comparing respective output values with an output value of the reference detector; and
   a calculation unit configured to calculate a feature quantity of the input pattern based on an output value from the reference detector and the selected feature detector.

* * * * *